United States Patent
Menahem et al.

(10) Patent No.: US 11,030,312 B2
(45) Date of Patent: Jun. 8, 2021

(54) SYSTEM AND METHOD FOR MACHINE BASED DETECTION OF A MALICIOUS EXECUTABLE FILE

(71) Applicant: International Business Machines Corporation, Armonk, NY (US)

(72) Inventors: Eitan Menahem, Beer Sheva (IL); Gal Steimberg, Yavne (IL)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 16/133,713

(22) Filed: Sep. 18, 2018

(65) Prior Publication Data

US 2020/0089882 A1 Mar. 19, 2020

(51) Int. Cl.
*G06F 21/56* (2013.01)
*G06N 99/00* (2019.01)
*G06N 20/00* (2019.01)

(52) U.S. Cl.
CPC .......... *G06F 21/565* (2013.01); *G06N 20/00* (2019.01); *G06F 2221/034* (2013.01)

(58) Field of Classification Search
CPC ....... G06F 21/55; G06F 21/565; G06N 20/00; G06N 7/005
See application file for complete search history.

(56) References Cited

U.S. PATENT DOCUMENTS

| | | | |
|---|---|---|---|
| 8,826,439 B1 * | 9/2014 | Hu | G06F 21/56 726/24 |
| 9,665,713 B2 | 5/2017 | Avasarala et al. | |
| 9,864,956 B1 * | 1/2018 | Sai | G06N 3/02 |
| 10,713,358 B2 * | 7/2020 | Sikorski | G06F 21/563 |
| 2015/0058982 A1 * | 2/2015 | Eskin | H04L 63/1425 726/23 |
| 2015/0248556 A1 * | 9/2015 | Sickendick | G06F 21/563 726/23 |
| 2016/0335435 A1 * | 11/2016 | Schmidtler | G06N 20/00 |
| 2017/0068816 A1 | 3/2017 | Cavazos | |

(Continued)

OTHER PUBLICATIONS

Silvio Cesare et al., Wire—A Formal Intermediate Language for Binary Analysis, IEEE (Year: 2012).*

(Continued)

*Primary Examiner* — Shanto Abedin
(74) *Attorney, Agent, or Firm* — G. E. Ehrlich

(57) ABSTRACT

A system for training a file classification model for classifying malicious software comprising at least one hardware processor adapted to: computing a plurality of datasets, each for one of a plurality of executable files, each file having a label, each dataset is computed by: receiving a respective file; detecting a plurality of binary functions in the respective file; translating each of the respective plurality of binary functions to produce a plurality of disassembled functions; clustering a plurality of operation-codes identified in the plurality of disassembled functions into a plurality of clusters according to respective operation-code; computing a plurality of statistical values of the plurality of disassembled functions and the plurality of clusters; and associating the plurality of statistical values with the file's label to produce a dataset; and training a file classification model using the plurality of datasets to compute at least one classification score of an input file.

20 Claims, 6 Drawing Sheets

(56) References Cited

U.S. PATENT DOCUMENTS

2018/0082064 A1* 3/2018 Wang .................. G06N 20/00
2020/0042701 A1* 2/2020 Yang .................. G06K 9/6292

OTHER PUBLICATIONS

Shabtai et al., "Detection of malicious code by applying machine learning classifiers on static features: A state-of-the art survey", Information Security Technical Report, Feb. 2009, pp. 16-29, vol. 14, Issue 1.

Masud et al., "A scalable multi-level feature extraction technique to detect malicious executables", Information System Frontiers, Mar. 2008, pp. 33-45, vol. 10, Issue 1.

Woo et al., "Method of Detecting Malware Through Analysis of Opcodes Frequency with Machine Learning Technique", Advances in Computer Science and Ubiquitous Computing. UCAWSN 2016, CUTE 2016, CSA 2016. Lecture Notes in Electrical Engineering, vol. 421. Springer, Singapore.

Santos et al., "Opcode sequences as representation of executables for data-mining-based unknown malware detection", Information Sciences, May 2013, pp. 64-82, vol. 231.

Christodorescu et al., "Semantics-aware malware detection", IEEE Symposium on Security and Privacy (S&P'05), 2005.

Wang et al., "A malware variants detection methodology with an opcode based feature method and a fast density based clustering algorithm", 12th International Conference on Natural Computation, Fuzzy Systems and Knowledge Discovery (ICNC-FSKD), 2016, pp. 481-487.

Kolosnjaji et al., "Empowering convolutional networks for malware classification and analysis", International Joint Conference on Neural Networks (IJCNN), 2017, pp. 3838-3845.

Shabtai et al., "F-sign: Automatic, function-based signature generation for malware", IEEE Transactions on Systems, Man, and Cybernetics, Part C (Applications and Reviews), Jul. 2011, pp. 494-508, vol. 41, Issue 4.

* cited by examiner

SYSTEM AND METHOD FOR MACHINE BASED DETECTION OF A MALICIOUS EXECUTABLE FILE

BACKGROUND

The present invention, in some embodiments thereof, relates to a file classification system and, more specifically, but not exclusively, to a file classification system for detecting malicious software executable files.

As used herein, the term software executable file means any digital file comprising a software object that may be executed by a hardware processor. Some software executable files comprise binary data. Some other executable files comprise data formatted in a symbolic language. Some examples of software objects are an executable computer program, a dynamically loaded library, and a script.

Software intentionally designed to cause damage to a computer, server or computer network is considered malicious. For brevity, the term malware is used to mean a malicious software executable file. Execution of malware may pose a risk to a private user or an organization. Malware detection systems may be used to detect malicious software files before the malware is able to cause damage. Contemporary malicious software files use various techniques to evade detection by malware detection systems, and in recent years malware masquerading techniques are improving continuously. Some malware detection systems use dynamic analysis methods; however such techniques require execution of a suspect file which is not always possible. Static analysis methods for malware detection may be considered more secure and more efficient than many dynamic analysis methods for malware detection.

SUMMARY

It is an object of the present invention to provide a system and a method for machine based detection of a malicious software executable file.

The foregoing and other objects are achieved by the features of the independent claims. Further implementation forms are apparent from the dependent claims, the description and the figures.

According to a first aspect of the invention, a system for training a file classification model for classifying malicious software comprises at least one hardware processor adapted to: computing a plurality of training datasets, each for one of a plurality of training executable software files, each file having a class label, each of the plurality of training datasets is computed by: receiving a respective training executable file; detecting a plurality of binary functions in the respective training executable file; translating each of the respective plurality of binary functions into a symbolic language to produce a plurality of disassembled functions; clustering a plurality of operation codes identified in the plurality of disassembled functions into a plurality of operation code clusters according to respective operation code; computing a plurality of statistical values of the plurality of disassembled functions and the plurality of operation code clusters; and associating the plurality of statistical values with the training executable file's class label to produce a training dataset; and training a file classification model using the plurality of training datasets to compute at least one classification score of an input file.

According to a second aspect of the invention, a method for training a file classification model for classifying malicious software comprises: computing a plurality of training datasets, each for one of a plurality of training executable software files, each file having a class label, each of the plurality of training datasets is computed by: receiving a respective training executable file; detecting a plurality of binary functions in the respective training executable file; translating each of the respective plurality of binary functions into a symbolic language to produce a plurality of disassembled functions; clustering a plurality of operation codes identified in the plurality of disassembled functions into a plurality of operation code clusters according to respective operation code; computing a plurality of statistical values of the plurality of disassembled functions and the plurality of operation code clusters; and associating the plurality of statistical values with the training executable file's label to produce a training dataset; and training a file classification model using the plurality of training datasets to compute at least one classification score of an input file.

According to a third aspect of the invention, a system for classifying malicious software comprises at least one hardware processor adapted to: receiving an executable software file; detecting a plurality of binary functions in the executable software file; translating each of the respective plurality of binary functions into a symbolic language to produce a plurality of disassembled functions; computing a plurality of statistical values of the plurality of disassembled functions and a plurality of operation code clusters; computing at least one classification score by inputting the plurality of statistical values to a file classification model trained by: computing a plurality of training datasets, each for one of a plurality of training executable software files, each file having a label, each of the plurality of training datasets is computed by:

receiving a respective training executable file; detecting a plurality of training binary functions in the respective training executable file; translating each of the respective plurality of training binary functions into a symbolic language to produce a plurality of training disassembled functions; clustering a plurality of training operation codes identified in the plurality of training disassembled functions into a plurality of training operation code clusters according to respective training operation code; computing a plurality of training statistical values of the plurality of training disassembled functions and the plurality of training operation code clusters; and associating the plurality of training statistical values with the training executable file's label to produce a training dataset; and training the file classification model using the plurality of training datasets to compute at least one classification score of an input file; and computing a file classification according to a comparison between the at least one classification score and a predetermined maliciousness score threshold value. The plurality of operation code clusters are the plurality of training operation code clusters.

With reference to the first and second aspects, in a first possible implementation of the first and second aspects of the present invention, clustering the plurality of operation codes comprises: identifying a plurality of operation code combinations, each comprising two of the plurality of operation codes; counting a plurality of operation code combination appearances identified in the plurality of disassembled functions; computing a plurality of distance values by computing an inverse of each of the respective operation combination appearance; converting the plurality of distance values into a sequence of lines of a text file using a serialization method; and clustering the plurality of operation codes into the plurality of operation code clusters by applying a clustering algorithm to the sequence of lines of the text. Optionally, counting the plurality of operation code combination appearances comprises: for each of the plurality of operation code combinations, for each of the plurality of disassembled functions, incrementing by one a counter associated with the operation code combination, subject to identifying the two operation codes of the operation code combination in the disassembled function. A distribution of operation codes in close proximity to each other in an executable software file may be used as a characteristic of the executable software file, thus identifying clusters of proximate operation codes may be used to characterize the executable software file. Some malicious executable software files may share similar distribution patterns of proximate operation codes.

With reference to the first and second aspects, in a second possible implementation of the first and second aspects of the present invention, clustering the plurality of operation codes comprises: associating with each of the plurality of operation codes at least one property value of at least one of a plurality of identified operation code properties; and clustering the plurality of operation codes according to respective operation code's at least one property value. Optionally, the at least one of the plurality of identified operation code properties is selected from a group consisting of: an amount of operation code operands, a type of an operation code operand, and a register associated with an operation code. A distribution in an executable software file of operation codes sharing a value of an identified property may be used as a characteristic of the executable software file, thus identifying clusters of operation codes having a similar identified property value may be used to characterize the executable software file. Some malicious executable software files may share similar distribution patterns of operation codes having a similar identified property value.

With reference to the first and second aspects, in a third possible implementation of the first and second aspects of the present invention, each of the plurality of operation codes is associated with an operation code family selected from a group of families consisting of: data transfer instructions, binary arithmetic instructions, decimal arithmetic instructions, logical instructions, shift-rotate instructions, bit-byte instructions, control operation codes, string instructions, input-output instructions, flag-control instructions, and miscellaneous operation codes. The plurality of operation codes is clustered according to respective operation code's operation code family. A distribution in an executable software file of operation codes sharing an operation code family may be used as a characteristic of the executable software file, thus identifying clusters of operation codes having a similar operation code family may be used to characterize the executable software file. Some malicious executable software files may share similar distribution patterns of operation codes having a similar operation code family.

With reference to the first and second aspects, in a fourth possible implementation of the first and second aspects of the present invention, the plurality of statistical values comprises at least one histogram of a distribution of the plurality of operation codes according to the plurality of operation code clusters, characteristic of the training executable file.

With reference to the first and second aspects, in a fifth possible implementation of the first and second aspects of the present invention, the plurality of statistical values comprises at least one statistical value computed according to a type of operand or an amount of operands of an operation code, characteristic of the training executable file. Optionally, the at least one statistical value computed according to a type of operand or an amount of operands of an operation code is selected from a group consisting of: a distribution of an average amount of operation codes of the plurality of operation codes in the plurality of disassembled functions according to a type of operand of each of the plurality of operation codes, and a distribution of an average amount of operation codes of the plurality of operation codes in the plurality of disassembled functions according to an amount of operands of each of the plurality of operation codes. A statistical value of operation codes in an executable software file according to a type of operand or an amount of operands of an operation code may be used as a characteristic of the executable software file. Some malicious executable software files may share similar statistical values computed according to a type of operand or an amount of operands of an operation code.

With reference to the first and second aspects, in a sixth possible implementation of the first and second aspects of the present invention, the plurality of statistical values comprises at least one statistical value computed according to an address operand of an operation code, characteristic of the training executable file. Optionally, the at least one statistical value computed according to an address operand of an operation code comprises a distribution of the plurality of operation codes in the plurality of disassembled functions according to a plurality of address operand values of the plurality of operation codes. A statistical value of operation codes in an executable software file according to an address operand may be used as a characteristic of the executable software file. Some malicious executable software files may share similar statistical values computed according to an address operand, for example when the malicious executable software file comprises instructions for accessing protected memory when executed.

With reference to the first and second aspects, in a seventh possible implementation of the first and second aspects of the present invention, computing the plurality of statistical values comprises identifying in the training executable file at least one computer instruction after all return instructions of a first binary function of the plurality of binary functions and before a first instruction of a second binary function of the plurality of binary functions, wherein existence of the at least one computer instruction is characteristic of the training executable file. A computer instruction after all return instructions of a first binary function and before a first instruction of a second binary function may be a malicious instruction inserted into an executable software file.

With reference to the first and second aspects, in an eighth possible implementation of the first and second aspects of the present invention, the plurality of statistical values comprises at least one statistical value computed according to at least one control-flow operation code, characteristic of the training executable file. A statistical value computed according to a control-flow operation code in an executable software file may be used as a characteristic of the executable software file. Some malicious executable software files may share similar statistical values computed according to a control-flow operation code, for example when an executable software file is modified to execute malicious instructions.

With reference to the first and second aspects, in a ninth possible implementation of the first and second aspects of the present invention, clustering the plurality of operation codes comprises using a predefined list of operation code clusters or a machine-learning-based clustering algorithm.

With reference to the first and second aspects, in a tenth possible implementation of the first and second aspects of the present invention, the at least one hardware processor is further adapted to store the trained file classification model on a digital storage connected to the at least one hardware processor. Optionally, the digital storage is connected to the at least one hardware processor by at least one digital communication network interface connected to the at least one hardware processor, or the digital storage is electrically connected to the at least one hardware processor. Storing a trained file classification model on a digital storage may facilitate using the trained file classification model in more than one classification systems, reducing cost of installation of multiple classification systems.

With reference to the third aspect, in a first possible implementation of the third aspect of the present invention, the file classification is one of a group of possible file classifications consisting of 'benign' and 'malicious', one classification score of the at least one classification score is associated with possible file classification 'malicious', and the file classification is 'benign' when the one classification score, associated with possible file classification 'malicious', is less than the predetermined maliciousness score threshold value, and otherwise the file classification is 'malicious'.

With reference to the third aspect, in a second possible implementation of the third aspect of the present invention, each of the at least one classification score is associated with one of a group of possible file classifications such that each of the group of possible file classifications has respective classification score. Optionally, the at least one hardware processor is further adapted to: identify a highest classification score of the at least one classification score; and assign a possible file classification having the highest classification score as the file classification.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
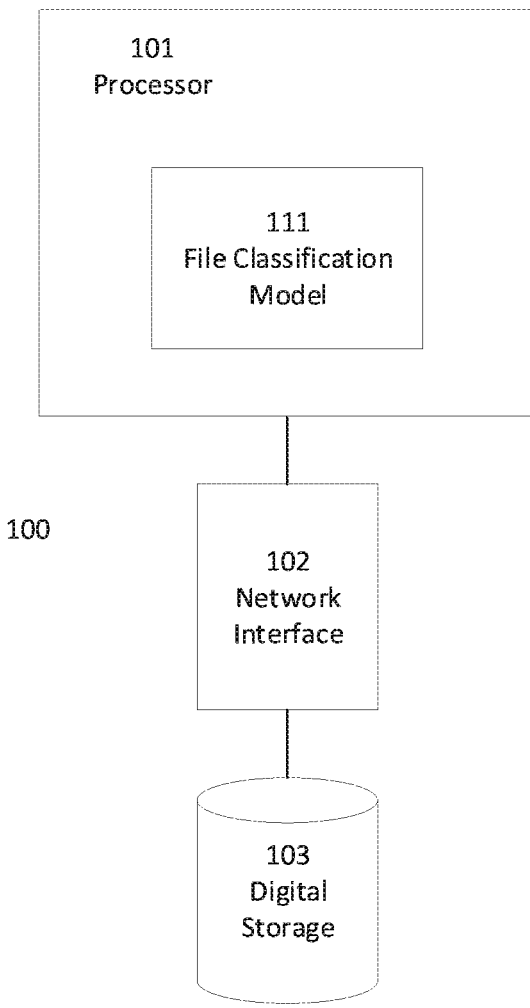
FIG. 1 is a schematic block diagram of an exemplary system for training a classification model, according to some embodiments of the present invention.

The present invention, in some embodiments thereof, relates to a file classification system and, more specifically, but not exclusively, to a file classification system for detecting malicious software executable files.

A system for detecting malware that uses static analysis methods may be expected to identify as large a variety of existing malware, preferably all existing malware, in addition to identifying variants and modifications of existing malware and continuously adapting to identify new malware as such new malware comes into existence, all this without executing a suspicious file. At the same time, the system for detecting malware is expected to identify benign software, i.e. a software executable file that is not malicious. Some existing methods for detection of malware comprise computing one or more file signatures. A signature is a unique pattern of one or more digital bytes or one or more digital representation of strings acting as a fingerprint of a file. Some systems compare a suspicious file's signature to a known repository of signatures. Such systems require frequent updating of the repository of signatures, as existing malware is modified and as new malware is developed, making such signature based methods effective only when malicious code does not change frequently. In addition, some existing signatures do not capture semantics of a software executable file and thus are less effective when a software executable file is obfuscated, i.e. deliberately created or modified to be difficult for humans to understand.

The present invention, in some embodiments thereof, proposes identifying in an input file a plurality of binary functions, translating the plurality of binary functions into a symbolic language, and analyzing semantics of the plurality of translated functions, known as disassembled functions, to produce a semantic signature of the input file. Optionally, the semantic signature comprises a plurality of statistical values of the plurality of the disassembled functions. A binary function is a function represented in binary format. A disassembled function is a translation of a binary function into a symbolic language. A binary function may be a part of a binary software executable file. Analyzing a plurality of disassembled functions may increase reliability of a malware detection system as analyzing the plurality of disassembled functions may facilitate semantic analysis of the plurality of disassembled functions not possible when analyzing the plurality of binary functions. In addition, analyzing the plurality of disassembled functions may facilitate recognizing a plurality of patterns not observable in the plurality of binary functions, which in turn may reduce an amount of differences between an original signature of an original software executable file and a new signature of an obfuscated executable file created from the original software executable.

In addition, the present invention, in some embodiments thereof, proposes using a machine learning file classification model for computing an input file's maliciousness classification. Optionally, the maliciousness classification has a classification score. Optionally, an input file is classified as malicious subject to the classification score of the input file's maliciousness classification exceeding a predetermined maliciousness score threshold value. Using a machine learning classification model to compute an input file's maliciousness classification may facilitate identifying as malicious new malware and additionally or alternately modified malware, without updating the malware detection system, potentially increasing reliability of the malware detection system, and additionally potentially reducing cost of operation by eliminating a dependency on frequent updates. The present invention further proposes, in some embodiments, a system and method for training the machine learning file classification model to use for computing the input file's maliciousness classification and the maliciousness classification's classification score.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100 for training a classification model, according to some embodiments of the present invention. In such embodiments, at least one hardware processor 101 executes file classification model 111 and is connected to at least one digital storage 103, for the purpose of storing file classification model 111 after file classification model 111 has been trained. Optionally, at least one digital storage 103 is a non-volatile digital storage, for example a hard disk or a network storage device. Optionally at least one digital storage 103 is electrically connected to at least one hardware processor 101. Optionally, at least one digital storage 103 is connected via at least one digital communication network interface 102, connected to at least one hardware processor 101. Optionally, at least one digital communication network interface 102 is connected to a Local Area Network (LAN), for example an Ethernet network or a Wireless-Fidelity (WiFi) network. Optionally, at least one digital communication network interface 102 is connected to a Wide Area Network (WAN), for example the Internet or a private WAN.

To train file classification model 111, in some embodiments of the present invention system 100 implements the following optional method.

Figure 2:
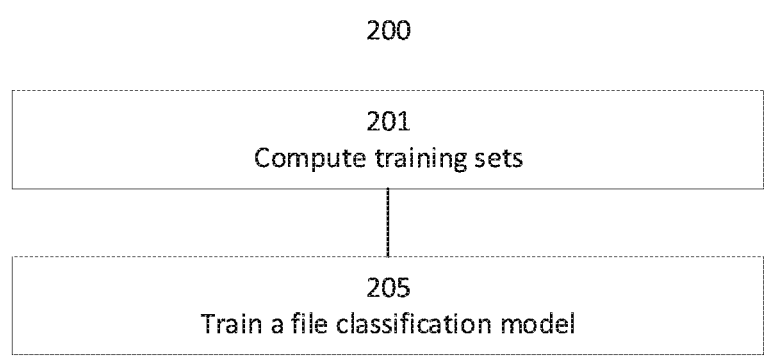
FIG. 2 is a flowchart schematically representing an optional flow of operations for training a classification model, according to some embodiments of the present invention.

Reference is now made also to FIG. 2, showing a flowchart schematically representing an optional flow of operations 200 for training a classification model, according to some embodiments of the present invention. In such embodiments, in 201 at least one hardware processor 101 computes a plurality of training datasets and in 205 at least one hardware processor 101 trains file classification model 111 using the plurality of training datasets to compute one or more classification scores of an input file. Optionally, each of the plurality of training sets is computed for one of a plurality of training executable software files, each file having a class label, indicative of the file's maliciousness. For example the class label may be selected from a pair of labels 'malicious' and 'benign'. Optionally, the class label is selected from a plurality of class labels comprising two or more class labels, for example 'malware', 'benign', and 'ransomware'. Optionally, the one or more classification scores of the input file, computed by file classification model 111, are each a value indicative of a probability that the input file is malicious. Optionally, each of the one or more classification scores is associated with one of the plurality of class labels and is a classification probability value indicative of a probability that the input file has respective class label. Optionally, after training file classification model 111, at least one hardware processor 101 stores file classification model 111 in at least one digital storage 103. Optionally, after training file classification model 111, at least one hardware processor 101 sends file classification model 111 to at least one other hardware processor via at least one digital communication network 102, for example for the purpose of being used for classification of malicious software by the at least one other hardware processor.

Figure 3:
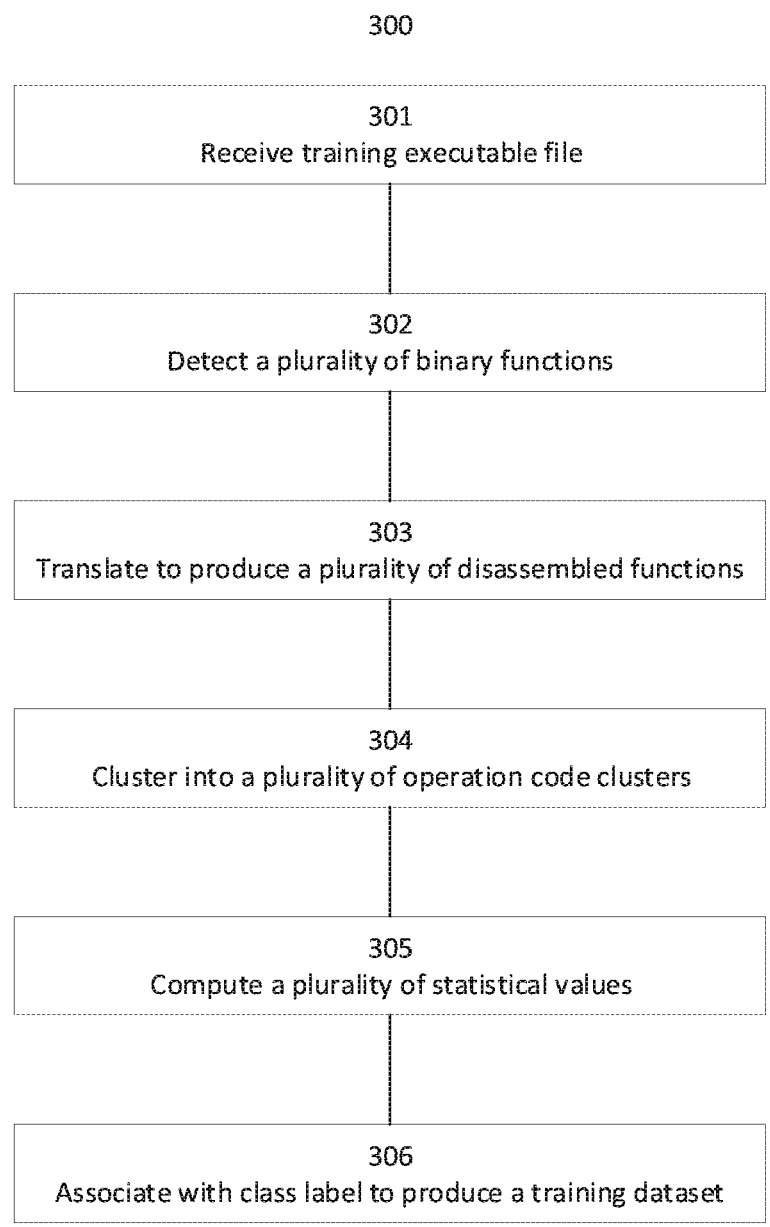
FIG. 3 is a flowchart schematically representing an optional flow of operations for computing a training dataset, according to some embodiments of the present invention.

Reference is now made also to FIG. 3, showing a flowchart schematically representing an optional flow of operations 300 for computing a training dataset for one training executable software file in 201, according to some embodiments of the present invention. In such embodiments, at least one hardware processor 101 receives in 301 the training executable software file. Optionally, at least one hardware processor 101 receives the training executable software file via at least one digital network communication interface 102. Optionally, at least one hardware processor 101 retrieves the training executable file from at least one digital storage 103. In 302, at least one hardware processor 101 optionally detects a plurality of binary functions in the training executable software file. Optionally, at least one hardware processor 101 uses methods as known in the art to detect the plurality of binary functions in the training executable software file. In computer programming, the term "disassemble" refers to translating code from a binary format into a symbolic language. In 303, at least one hardware processor optionally disassembles each of the plurality of binary functions, i.e. translates each of the plurality of binary functions into a symbolic language, to produce a plurality of disassembled functions. Optionally, at least one hardware processor 101 identifies in the plurality of disassembled functions a plurality of operation codes and in 304 optionally clusters the plurality of operation codes into a plurality of operation code clusters according to respective operation code. Optionally, each operation code of the plurality of operation codes is associated with an operation code family. Examples of an operation code family are: data transfer instructions, binary arithmetic instructions, decimal arithmetic instructions, logical instructions, shift-rotate instructions, bit-byte instructions, control operation codes, string instructions, input-output instructions, flag-control instructions, and miscellaneous operation codes. Optionally, in 304 at least one hardware processor 101 clusters the plurality of operation codes into the plurality of operation code clusters according to respective operation code's operation code family Optionally, at least one hardware processor 101 uses a predefined list of operation code clusters or a machine-learning-based clustering algorithm to cluster the plurality of operation codes into the plurality of operation code clusters.

Figure 4A:
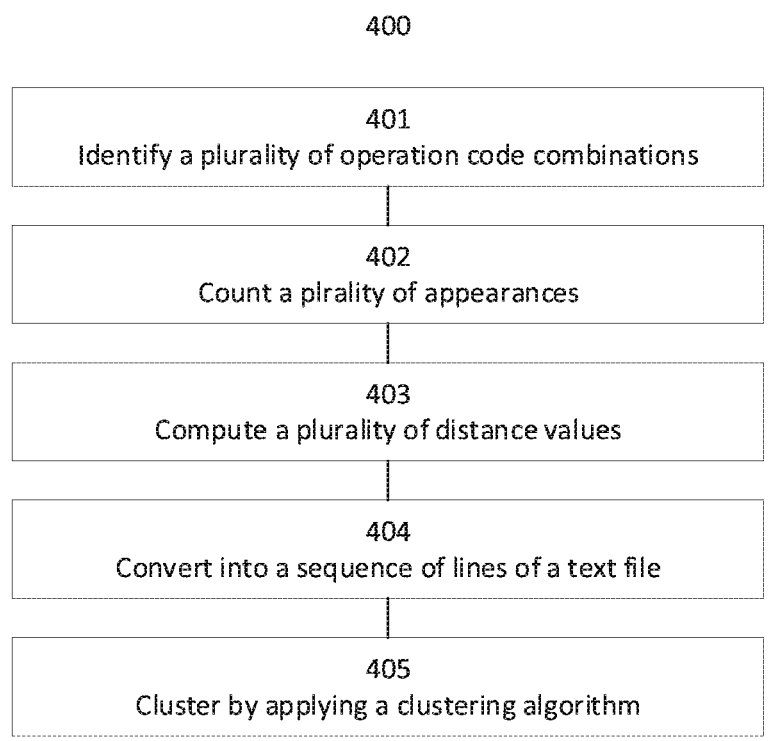
FIGS. 4A and 4B are flowcharts schematically representing two optional flows of operations for clustering a plurality of operation codes, according to some embodiments of the present invention.
Figure 4B:
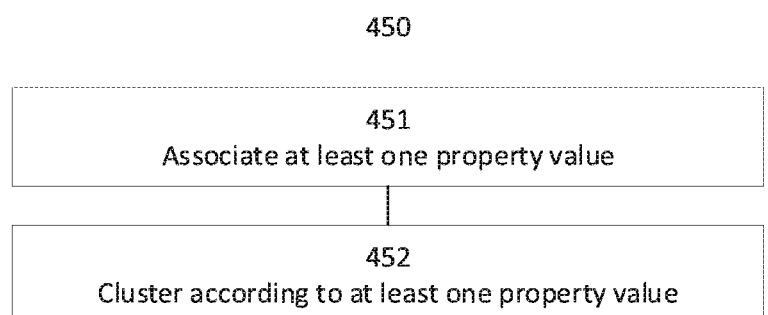

Additionally or alternatively, at least one hardware processor 101 may cluster the plurality of operation codes according to one or more other criteria. Reference is now made also to FIGS. 4A and 4B, showing flowcharts schematically representing two optional flows of operations 400 and 450 for clustering the plurality of operation codes, according to some embodiments of the present invention.

Referring to FIG. 4A, in some embodiments of the present invention in 401 at least one hardware processor 101 identifies a plurality of operation code combinations, each comprising two of the plurality of operation codes and in 402 at least one hardware processor 101 counts a plurality of operation code combination appearances identified in the plurality of disassembled functions. A respective operation code combination may appear in one or more of the plurality of disassembled functions. Optionally an operation code combination is according to proximity of the two operation codes in the one or more of the plurality of disassembled functions. Optionally, an operation code combination is additionally according to an order of appearance of the two operation codes in the one or more of the plurality of disassembled functions. Optionally at least one hardware processor 101 associates a counter with each of the plurality of operation code combinations, and for each of the plurality of operation code combinations, for each disassembled function of the plurality of disassembled functions, at least one hardware processor 101 optionally increments the counter associated with the operation code combination when the two operation codes of the operation code combination are identified in the disassembled function. In 403, at least one hardware processor 101 optionally computes a plurality of distance values by computing an inverse of each of the respective operation combination appearances and in 404 at least one hardware processor 101 optionally converts the plurality of distances into a sequence of lines of a text file using a serialization method in a serialization format as known in the art. In computer programming, the term serialization refers to a process of translating structured data into a format that can be stored (for example, in a file or memory buffer) or transmitted (for example, via a digital communication network interface) and reconstructed later (possibly in a different computer environment). Examples of a serialization format are JavaScript Object Notation (JSON) and Base64 encoding. Optionally each of the sequence of lines is an American Standard Code for Information Interchange (ASCII) string. In 405, at least one hardware processor 101 optionally clusters the plurality of operation codes into the plurality of operation code clusters by applying a clustering algorithm to the sequence of lines of the text file. Optionally, the clustering algorithm is a k-means clustering algorithm. Optionally the clustering algorithm is an Expectation-Maximization algorithm. Some other examples of a clustering algorithm are hierarchical clustering and Density-based spatial clustering of applications with noise. Optionally, each of the operation code clusters comprises a set of operation codes likely to appear together in one or more disassembled functions.

Referring to FIG. 4B, in some embodiments of the present invention in 451 at least one hardware processor 101 associates with each of the plurality of operation codes at least one property value of at least one of a plurality of identified operation code properties. Examples of an operation code property are: an amount of operation code operands, a type of an operation code operand, and a register associated with an operation code. In 452, at least one hardware processor 101 optionally clusters the plurality of operation codes according to respective operation code's at least one property value. For example, all operation codes of the plurality of operation codes having an identified amount of operation code operands may be clustered in one of the plurality of operation code clusters. In another example, all operation codes of the plurality of operation codes having a memory address operand may be clustered in another one of the plurality of operation code clusters.

Reference is now made again to FIG. 3. In 305, at least one hardware processor 101 optionally computes a plurality of statistical values of the plurality of disassembled functions and the plurality of operation code clusters. Optionally, the plurality of statistical values comprises at least one histogram of a distribution of the plurality of operation codes according to the plurality of operation code clusters, characteristic of the training executable file i.e. the at least one histogram is a distinguishing quality of the training executable file. Optionally, the plurality of statistical values comprises at least one statistical value computed according to a type of operand or an amount of operands of an operation code, characteristic of the training executable file. Examples of a statistical value computed according to a type of operand or an amount of operands of an operation code are: a distribution of an average amount of operation codes of the plurality of operation codes in the plurality of disassembled functions according to a type of operand of each of the plurality of operation codes, and a distribution of an average amount of operation codes of the plurality of operation codes in the plurality of disassembled functions according to an amount of operands of each of the plurality of operation codes. Optionally, the plurality of statistical values comprises at least one statistical value computed according to an address operand of an operation code, characteristic of the training executable file. Optionally, the at least one statistical value computed according to an address operand of an operation code comprises a distribution of the plurality of operation codes in the plurality of disassembled functions according to a plurality of address operand values of the plurality of operation codes. Optionally, computing the plurality of statistical values comprises identifying in the training executable file at least one computer instruction after all return instructions of a first binary function of the plurality of binary functions and before a first instruction of a second binary function of the plurality of binary functions, wherein existence of the at least one computer instruction is characteristic of the training executable file. Optionally, the plurality of statistical values comprises at least one statistical value computed according to a control-flow operation code, characteristic of the training executable file. For example, JMP is one possible Intel x86 control-flow operation code.

Reference is now made again to FIG. 3. In 306 at least one hardware processor 101 optionally associates the plurality of statistical values with the training executable file's class label to produce a training dataset of the plurality of training datasets.

Figure 5:
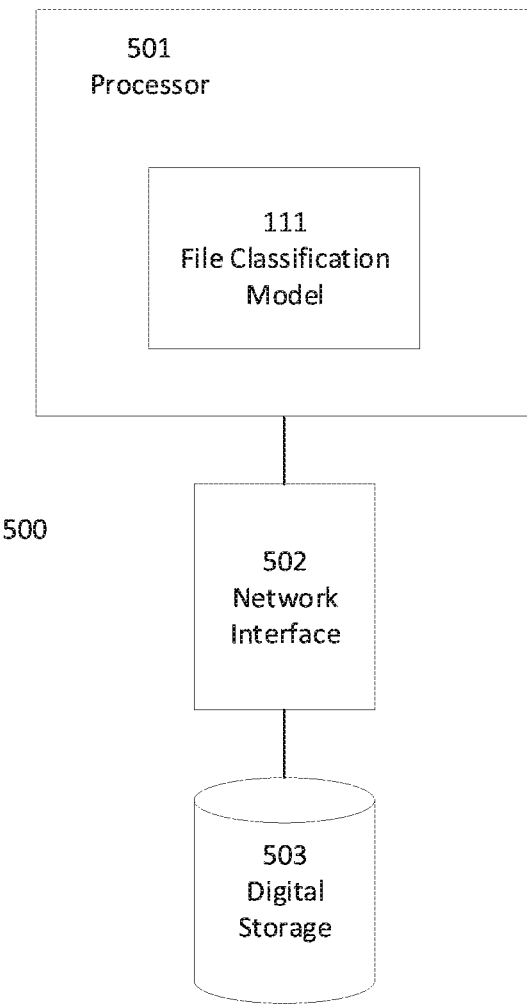
FIG. 5 is a schematic block diagram of an exemplary system for classifying a file, according to some embodiments of the present invention.

In some embodiments of the present invention, file classification model 111 is used for classifying malicious software. Reference is now made to FIG. 5, showing a schematic block diagram of an exemplary system 500 for classifying a file, according to some embodiments of the present invention. In such embodiments at least one hardware processor 501 executes file classification model 111, trained by system 100, optionally using flow of operations 200. Optionally, at least one hardware processor 501 is connected to at least one digital communication network interface 502 for the purpose of receiving one or more input files and additionally or alternately for the purpose of outputting a classification of an input file for example by sending a message indicative of the classification to at least one other hardware processor. Optionally, at least one hardware processor 501 is connected to at least one digital storage 503, optionally via at least one digital communication network interface 502. Optionally, at least one hardware processor 501 retrieves file classification model 111 from at least one digital storage 503. Optionally, at least one digital storage 503 is a non-volatile digital storage, for example a hard disk or a network storage device. Optionally, at least one hardware processor 501 receives file classification model 111 via at least one digital communication network interface 502 from at least one training system. Optionally, at least one digital communication network interface 502 is connected to a Local Area Network (LAN), for example an Ethernet network or a Wireless-Fidelity (WiFi) network. Optionally, at least one digital communication network interface 502 is connected to a Wide Area Network (WAN), for example the Internet or a private WAN.

To classify malicious software, in some embodiments of the present invention system 500 implements the following optional method.

Figure 6:
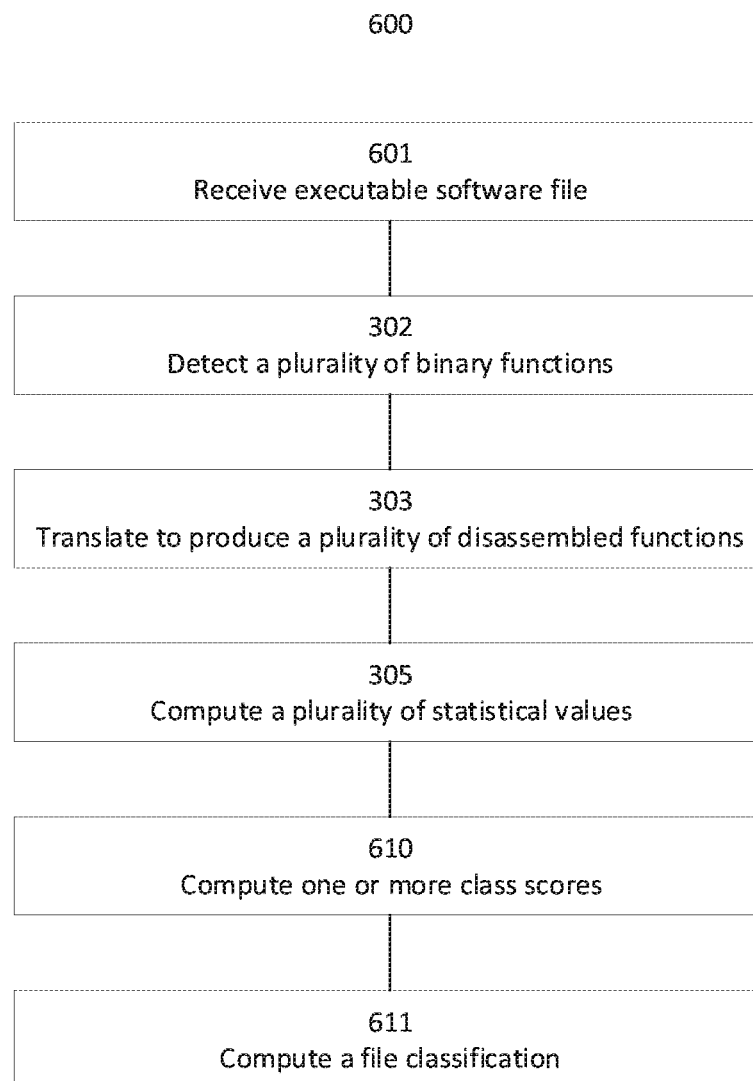
FIG. 6 is a flowchart schematically representing an optional flow of operations for classifying a file, according to some embodiments of the present invention.

Reference is now made also to FIG. 6, showing a flowchart schematically representing an optional flow of operations for classifying a file, according to some embodiments of the present invention. In such embodiments, in 601 at least one hardware processor 501 receives a software executable file, optionally via at least one digital communication network interface 502. Next, at least one processor 501 processes the software executable similarly to producing the plurality of statistical values in flow of operations 300. In 302, at least one hardware processor 501 detects a plurality of binary functions in the executable software file, and in 303 at least one hardware processor 501 optionally translates each of the respective plurality of binary functions into a symbolic language to produce a plurality of disassembled functions. In 305, at least one hardware processor 501 optionally computes a plurality of statistical values of the plurality of disassembled functions and the plurality of operation clusters produced when training file classification model 111. In 610, at least one hardware processor 501 optionally computes one or more classification scores by inputting the plurality of statistical values to file classification model 111. Optionally, file classification model 111 was trained by system 100 using flow of operations 200. Optionally, the one or more classification scores are indicative of a probability the executable software file is malicious. Optionally, each of the one or more classification scores is associated with one of a plurality of class labels and is a classification probability value indicative of a probability that the input file has respective class label. Optionally, the one or more classification scores are each a value in the range from 0 to 1. In 611, at least one hardware processor 501 optionally computes a file classification according to a comparison between the one or more classification scores and a predetermined score threshold value. For example, in embodiments having two maliciousness labels associated with two maliciousness classifications—'malicious' and 'benign'—when a classification score associated with each of the two maliciousness labels is a value in the range from 0 to 1, a file classification may be 'malicious' when the class score of maliciousness label 'malicious' is greater than 0.7 or 0.9, otherwise the file classification may be 'benign'. Optionally, the predetermined score threshold value is another value between 0 and 1, for example 0.3 or 0.55. When the file classification is a member of a group of possible file classifications, at least one hardware processor

501 optionally computes a plurality of classification scores by computing for each of the group of possible file classifications a class score. Optionally, at least one hardware processor 501 identifies a highest classification score in the plurality of classification scores, and optionally selects one of the plurality of file classifications having the highest class score as the file classification.

Optionally, at least one hardware processor 501 outputs the file classification, for example by sending a message to at least one other hardware processor via at least one digital communication network interface 502. Optionally, at least one hardware processor 501 outputs the file classification by displaying a message of a display monitor connected to at least one hardware processor 501.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant statistical values will be developed and the scope of the term statistical value is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for training a file classification model for classifying malicious software comprising at least one hardware processor adapted to:

computing a plurality of training datasets, each for one of a plurality of training executable software files, each file having a class label, each of the plurality of training datasets is computed by:
  receiving a respective training executable file;
  detecting a plurality of binary functions in the respective training executable file;
  translating each of the respective plurality of binary functions into a symbolic language to produce a plurality of disassembled functions;
  clustering a plurality of operation codes identified in the plurality of disassembled functions into a plurality of operation code clusters according to respective operation code;
  computing a plurality of statistical values of the plurality of disassembled functions and the plurality of operation code clusters; and
  associating the plurality of statistical values with the training executable file's class label to produce a training dataset; and training a file classification model using the plurality of training datasets to compute at least one classification score of an input file.

2. The system of claim 1, wherein clustering the plurality of operation codes comprises:
identifying a plurality of operation code combinations, each comprising two of the plurality of operation codes;

counting a plurality of operation code combination appearances identified in the plurality of disassembled functions;
computing a plurality of distance values by computing an inverse of each of the respective operation combination appearance;
converting the plurality of distance values into a sequence of lines of a text file using a serialization method; and
clustering the plurality of operation codes into the plurality of operation code clusters by applying a clustering algorithm to the sequence of lines of the text.

3. The system of claim 2, wherein counting the plurality of operation code combination appearances comprises:
for each of the plurality of operation code combinations:
for each of the plurality of disassembled functions:
incrementing by one a counter associated with the operation code combination, subject to identifying the two operation codes of the operation code combination in the disassembled function.

4. The system of claim 1, wherein clustering the plurality of operation codes comprises:
associating with each of the plurality of operation codes at least one property value of at least one of a plurality of identified operation code properties; and
clustering the plurality of operation codes according to respective operation code's at least one property value.

5. The system of claim 4, wherein the at least one of the plurality of identified operation code properties is selected from a group consisting of: an amount of operation code operands, a type of an operation code operand, and a register associated with an operation code.

6. The system of claim 1, wherein each of the plurality of operation codes is associated with an operation code family selected from a group of families consisting of: data transfer instructions, binary arithmetic instructions, decimal arithmetic instructions, logical instructions, shift-rotate instructions, bit-byte instructions, control operation codes, string instructions, input-output instructions, flag-control instructions, and miscellaneous operation codes; and
wherein the plurality of operation codes are clustered according to respective operation code's operation code family.

7. The system of claim 1, wherein the plurality of statistical values comprises at least one histogram of a distribution of the plurality of operation codes according to the plurality of operation code clusters, characteristic of the training executable file.

8. The system of claim 1, wherein the plurality of statistical values comprises at least one statistical value computed according to a type of operand or an amount of operands of an operation code, characteristic of the training executable file.

9. The system of claim 8, wherein the at least one statistical value computed according to a type of operand or an amount of operands of an operation code is selected from a group consisting of: a distribution of an average amount of operation codes of the plurality of operation codes in the plurality of disassembled functions according to a type of operand of each of the plurality of operation codes, and a distribution of an average amount of operation codes of the plurality of operation codes in the plurality of disassembled functions according to an amount of operands of each of the plurality of operation codes.

10. The system of claim 1, wherein the plurality of statistical values comprises at least one statistical value computed according to an address operand of an operation code, characteristic of the training executable file.

11. The system of claim 10, wherein the at least one statistical value computed according to an address operand of an operation code comprises a distribution of the plurality of operation codes in the plurality of disassembled functions according to a plurality of address operand values of the plurality of operation codes.

12. The system of claim 1, wherein computing the plurality of statistical values comprises identifying in the training executable file at least one computer instruction after all return instructions of a first binary function of the plurality of binary functions and before a first instruction of a second binary function of the plurality of binary functions, wherein existence of the at least one computer instruction is characteristic of the training executable file.

13. The system of claim 1, wherein the plurality of statistical values comprises at least one statistical value computed according to at least one control-flow operation code, characteristic of the training executable file.

14. The system of claim 1, wherein the at least one hardware processor is further adapted to store the trained file classification model on a digital storage connected to the at least one hardware processor.

15. The system of claim 14, wherein the digital storage is connected to the at least one hardware processor by at least one digital communication network interface connected to the at least one hardware processor, or the digital storage is electrically connected to the at least one hardware processor.

16. The system of claim 1, wherein clustering the plurality of operation codes comprises using a predefined list of operation code clusters or a machine-learning-based clustering algorithm.

17. A method for training a file classification model for classifying malicious software comprising:
computing a plurality of training datasets, each for one of a plurality of training executable software files, each file having a class label, each of the plurality of training datasets is computed by:
receiving a respective training executable file;
detecting a plurality of binary functions in the respective training executable file;
translating each of the respective plurality of binary functions into a symbolic language to produce a plurality of disassembled functions;
clustering a plurality of operation codes identified in the plurality of disassembled functions into a plurality of operation code clusters according to respective operation code;
computing a plurality of statistical values of the plurality of disassembled functions and the plurality of operation code clusters; and
associating the plurality of statistical values with the training executable file's label to produce a training dataset; and
training a file classification model using the plurality of training datasets to compute at least one classification score of an input file.

18. A system for classifying malicious software comprising at least one hardware processor adapted to:
receiving an executable software file;
detecting a plurality of binary functions in the executable software file;
translating each of the respective plurality of binary functions into a symbolic language to produce a plurality of disassembled functions;
computing a plurality of statistical values of the plurality of disassembled functions and a plurality of operation code clusters;

computing at least one classification score by inputting the plurality of statistical values to a file classification model trained by:
  computing a plurality of training datasets, each for one of a plurality of training executable software files, each file having a label, each of the plurality of training datasets is computed by:
    receiving a respective training executable file;
    detecting a plurality of training binary functions in the respective training executable file;
    translating each of the respective plurality of training binary functions into a symbolic language to produce a plurality of training disassembled functions;
    clustering a plurality of training operation codes identified in the plurality of training disassembled functions into a plurality of training operation code clusters according to respective training operation code;
    computing a plurality of training statistical values of the plurality of training disassembled functions and the plurality of training operation code clusters; and
    associating the plurality of training statistical values with the training executable file's label to produce a training dataset; and
  training the file classification model using the plurality of training datasets to compute at least one classification score of an input file; and
computing a file classification according to a comparison between the at least one classification score and a predetermined maliciousness score threshold value;
wherein the plurality of operation code clusters are the plurality of training operation code clusters.

19. The system of claim 18, wherein the file classification is one of a group of possible file classifications consisting of 'benign' and 'malicious';
  wherein one classification score of the at least one classification score is associated with possible file classification 'malicious'; and
  wherein, the file classification is 'benign' when the one classification score, associated with possible file classification 'malicious', is less than the predetermined maliciousness score threshold value, and otherwise the file classification is 'malicious'.

20. The system of claim 18, wherein each of the at least one classification score is associated with one of a group of possible file classifications such that each of the group of possible file classifications has respective classification score; and
  wherein the at least one hardware processor is further adapted to:
    identify a highest classification score of the at least one classification score; and
    assign a possible file classification having the highest classification score as the file classification.

* * * * *